March 19, 1957          H. L. SPOHN          2,785,905
TOY VEHICLE IN THE NATURE OF A ROCKING HORSE
Filed July 7, 1955
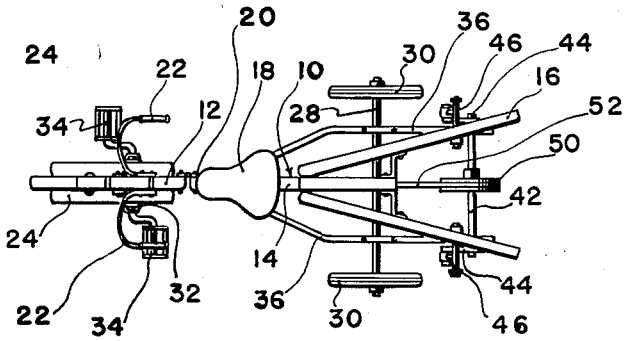
Fig. 1.
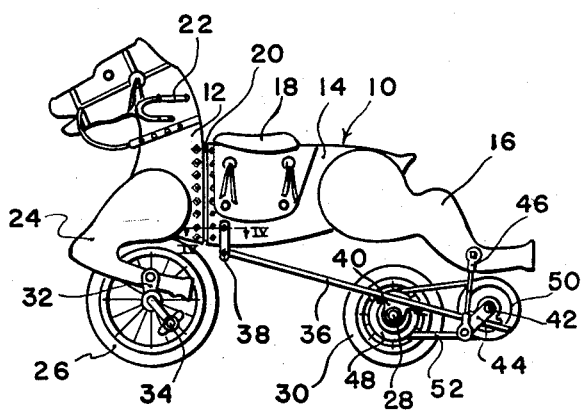
Fig. 2.
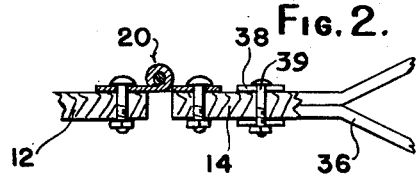
Fig. 4.
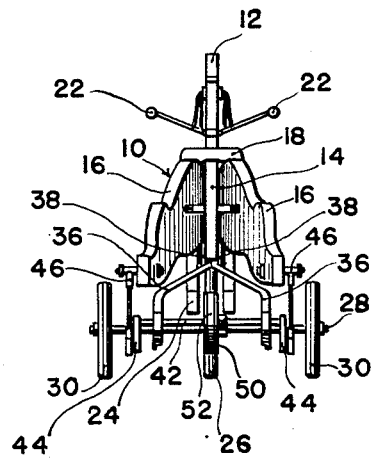
Fig. 3.
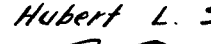
INVENTOR.
Hubert L. Spohn
BY
ATTORNEY

United States Patent Office 2,785,905
Patented Mar. 19, 1957

2,785,905

TOY VEHICLE IN THE NATURE OF A ROCKING HORSE

Hubert L. Spohn, Culver, Kans.

Application July 7, 1955, Serial No. 520,416

1 Claim. (Cl. 280—1.192)

This invention relates to toy vehicles and particularly to a wheeled device provided with a supporting body that is swingable about the axis of rotation of one of the wheels and equipped with novel structure carried by a rear wheel and axle assembly for imparting swinging or rocking movement to the body as the vehicle is advanced.

The most important object of the instant invention is to provide a vehicle for children that has a drive shaft operably coupled with a rear wheel and axle assembly and disposed in supporting relationship to the rear end of the body through cranks and throw arms whereby the swinging action takes place automatically as the rear axle rotates.

A further object of the present invention is the provision of a rocking-horse-type of tricycle arrangement wherein the structure for causing rocking movement is carried by a tongue pivotally coupled with the body and connected in towing relationship to the rear wheel and axle assembly.

A still further object of the instant invention is the provision of a vehicle of the aforementioned character having the rocking features incorporated in a body arrangement which includes a pair of articulated sections permitting steering of the vehicle as the same is ridden by a child.

In the drawing:

Figure 1 is a plan view of a toy vehicle in the nature of a rocking horse made pursuant to the present invention.

Fig. 2 is a side elevational view thereof.

Fig. 3 is a rear elevational view thereof; and

Fig. 4 is an enlarged, fragmentary, detailed, cross-sectional view taken on line IV—IV of Fig. 2.

Body 10 of the vehicle about to be described, is preferably formed to simulate a horse as seen in Fig. 2, and to the end that the vehicle may be steered, body 10 is made into a front section 12 and a rear section 14, the latter of which includes a pair of rearwardly-extending legs 16 and a seat 18 representative of a saddle.

The two sections 12 and 14 are articulated for relative swinging movement on a substantially vertical axis through the medium of hinge means 20, as best seen in Fig. 4. Handle bars 22 and legs 24 are provided on the front section 12.

The entire body 10 is supported by a front wheel 26 and by a rear wheel and axle assembly that includes an axle 28 and a pair of rear wheels 30, one of which is rigidly attached to the axle 28.

The wheel 26 is disposed between the front legs 24 and the entire body 10 is swingable about the axis of rotation of the wheel 26 through the medium of brackets 32 secured to the legs 24 and pivotally mounted on the axle of wheel 26 which terminates in treadles 34.

The rear wheel and axle assembly is placed in towing relationship to the body 10 through the medium of a tongue in the nature of a Y-shaped yoke 36 pivotally connected to the body section 14 therebeneath adjacent the hinge means 20 by means of brackets 38 rigidly bolted or otherwise suitably secured to and depending from the body section 14 and pivot pins 39. Yoke 36 overlies the axle 28 and is pivotally connected thereto through the medium of bearings 40.

Yoke 36 extends rearwardly beyond the axle 28 and carries a drive shaft 42 for rotation in parallelism with the axle 28. A laterally extending crank 44 is secured rigidly to the shaft 42 at each end thereof respectively, and each crank 44 is in turn pivotally connected to corresponding legs 16 through use of throw arms 46.

Shaft 42 is driven directly from the axle 28 by pulleys 48 and 50 secured to axle 28 and shaft 42 respectively, and operably interconnected by a continuous belt 52.

It is clear from the foregoing that a child seated upon the "saddle" 18 of the body 10, may propel the vehicle by manipulating treadles 34 to rotate wheel 26. The vehicle may be guided as it is advanced by grasping the handle bars 22 since the section 12 swings freely with respect to section 14 on the hinge means 20.

During advancement to rotate the wheels 30 and therefore, the axle 28, the body 10 is swung or rocked about the axis of rotation of wheel 26, through the operable connection from axle 28 to the legs 16, through pulley 48, belt 52, pulley 50, cranks 44 and throw arms 46. The action closely simulates the gallop of a horse and is smooth and uniform, affording pleasure to the child without danger of injury. The entire assembly is balanced effectively to obviate any tendency of tipping.

Such additives for creating the effect of riding a horse or other animal may be provided as illustrated in the drawings as may be desired by the manufacturer.

Having thus described the invention what is claimed as new and desired to be secured by Letters Patent is:

A toy vehicle comprising an articulated, animal simulating body having a front section and a rear section pivotally interconnected for relative swinging movement therebetween about a substantially vertical axis; a front, ground-engaging wheel mounted on the front section for rotation about a horizontal axis; crank pedals on the front wheel for rotating the latter; a yoke-like tongue bifurcated throughout a rear part thereof; means pivotally connecting a forward part of the tongue to the rear section adjacent the forward extremity of the latter for swinging movement about a horizontal axis, said tongue extending rearwardly and downwardly from its zone of connection with the rear section; a wheel and axle assembly, including a pair of spaced, ground-engaging wheels mounted on a horizontal axle, at least one of said pair of wheels being rigid to the axle; means rotatably mounting the axle on the bifurcated part of the tongue intermediate the extremities of the latter; a horizontal crank shaft having a portion offset from the axis thereof; means rotatably mounting the axle on the bifurcated part of the tongue rearwardly of and parallel to the axle; an elongated throw arm pivotally interconnected at its opposite extremities with said portion of the crank shaft and the rear section adjacent the rear extremity of the latter; and an endless drive element operably coupling the axle with the crank shaft for rotating the latter as said pair of wheels proceed along the ground to swingably oscillate the front and rear sections as a unit about the horizontal axis of rotation of the front wheel.

References Cited in the file of this patent
UNITED STATES PATENTS

| | | |
|---|---|---|
| 526,984 | Wilson | Oct. 2, 1894 |
| 1,444,853 | Rowe | Feb. 13, 1923 |
| 1,541,097 | Baisden | June 9, 1925 |
| 1,859,617 | Carlstrom | May 24, 1932 |
| 2,527,684 | Moroney | Oct. 31, 1950 |